United States Patent
Hanes

[11] 3,719,070
[45] March 6, 1973

[54] DOUBLE SEALED TUBULAR CONNECTOR APPARATUS

[75] Inventor: James W. E. Hanes, Ventura, Calif.

[73] Assignee: Vetco Offshore Industries, Inc., Ventura, Calif.

[22] Filed: March 9, 1971

[21] Appl. No.: 122,304

[52] U.S. Cl. .............................73/37, 73/46, 285/18
[51] Int. Cl. ................................................G01m 3/04
[58] Field of Search ........73/37, 40, 46, 49.1; 285/18, 285/111, 91, 351

[56] References Cited

UNITED STATES PATENTS

| | | |
|---|---|---|
| 3,220,245 | 11/1965 | Van Winkle ............................73/46 |
| 3,333,870 | 8/1967 | Watkins ..................................285/18 |
| 2,597,193 | 5/1952 | Shaffer....................................73/46 |
| 2,518,318 | 8/1950 | Hinkson ...............................285/351 |
| 2,485,497 | 10/1949 | Lemley et al. .....................73/46 UX |

Primary Examiner—Louis J. Capozi
Attorney—Bernard Kriegel and Kendrick, Subkow & Kriegel

[57] ABSTRACT

An underwater tubular connector having a primary seal and a secondary seal for preventing leakage through the connector between its interior and exterior. Both seals are effected automatically in response to bringing companion connector members into coupled relation, any trapped fluid between the seals being permitted to escape through a hydraulic monitoring line extending to a vessel floating at the water surface, the monitoring line also being usable for applying fluid pressure to the region between the seals to test them for leakage. A valve controlled from the vessel determines the flow of fluid through the monitoring line, selectively permitting or preventing flow of fluid from the region between the seals through the monitoring line to control and sensing devices on the vessel, to enable such region to be continuously or selectively monitored and fluid to escape therefrom to prevent its being trapped.

10 Claims, 4 Drawing Figures

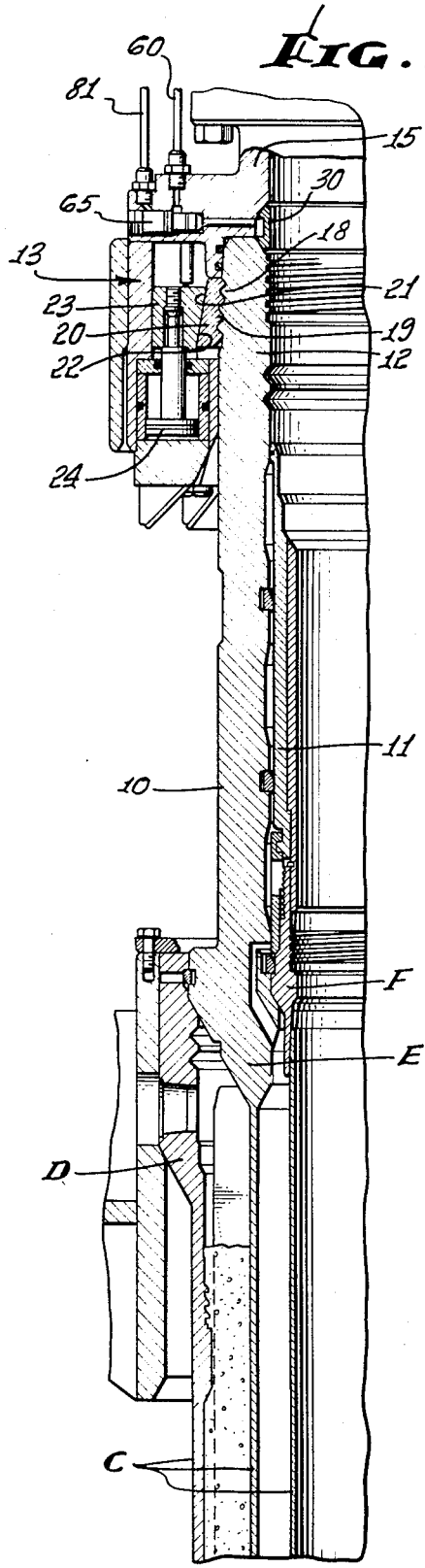
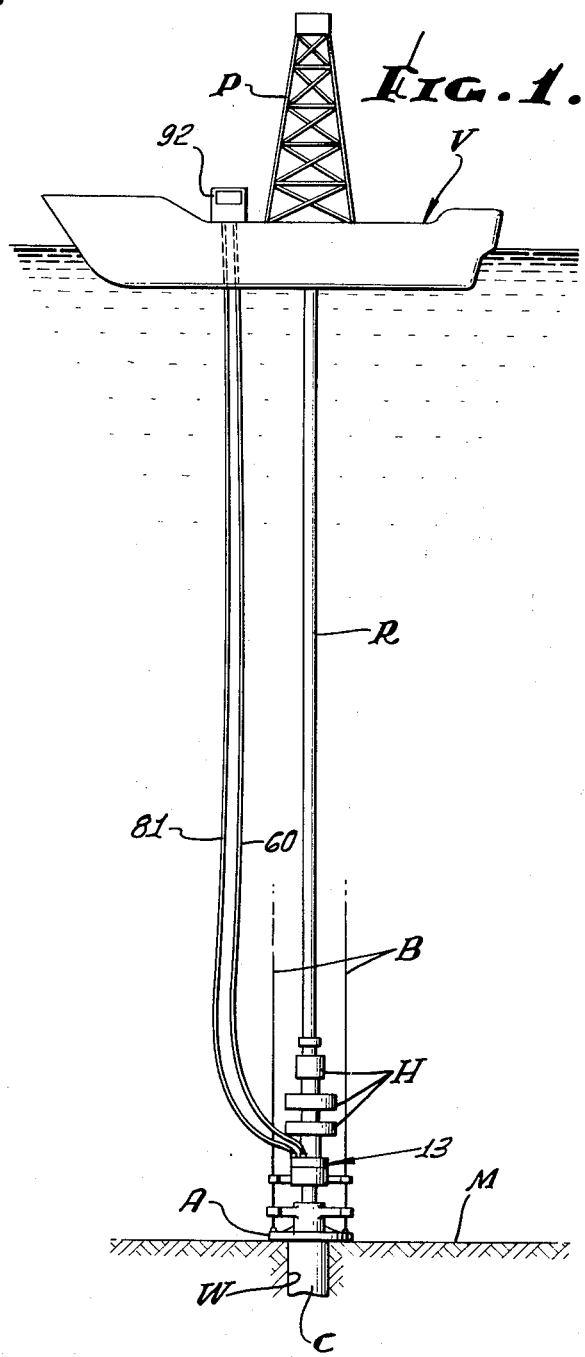

INVENTOR.
JAMES W. E. HANES
By Bernard Kriegel
ATTORNEY.

DOUBLE SEALED TUBULAR CONNECTOR APPARATUS

The present invention relates to underwater connectors, and more particularly to connectors having primary and secondary seals for preventing leakage from adjacent tubular connector members.

In the drilling of wells at an underwater location, a coupling is provided for securing various components together in pressure sealed relation. An example of such coupling is illustrated in U.S. Pat. No. 3,321,217. This coupling has a primary seal made effective automatically as a result of moving the coupling members axially with respect to one another and into full coupled relation. It has also been proposed to provide a secondary seal supplementing the primary seal, such as illustrated in U.S. Pat. No. 3,333,870. This last-mentioned patent renders the secondary seal effective only after the connector members have been coupled to one another, the primary seal being automatically completed in response to completion of the mechanical coupling between the members. It has also been proposed to provide a secondary seal which becomes effective before full coupling of the connector members to one another has been achieved.

With prior connectors having primary and secondary seals, the seals have been tested by running a test tool on a running string through a marine riser and blowout preventer stack (assuming the connector is disposed below the blowout preventer stack), the test tool being landed on a lower hanger housing or hanger, the blowout preventer stack then being closed around the running string and pressure being applied to the annular space between the running tool and the primary seal. With this arrangement, there is the possibility of damage to the seals of the test tool. Accordingly, if leakage occurs past the test tool seals, a successful test of the primary seal cannot be achieved. The pressure is usually applied through a kill line extending from the floating vessel to the annular space below the blowout preventer stack. In the event of a leak occuring in this kill line, a proper test cannot be carried out. For that matter, the test may not achieve its purpose since the primary seal might leak, the secondary seal holding pressure.

As pointed out in U.S. Pat. No. 3,333,870, if both the primary and secondary seals are effective before the coupling members are brought to their final coupled position, fluid might be trapped between such seals, making it difficult for the coupling to be completed. Although such patent discloses a coupling arrangement in which the secondary seal is not completed until after the members have been coupled to one another, the secondary seal may not be effected against a clean surface and may, therefore, leak. Such secondary seal is effected through the application of pressure through a hydraulic line extending to the vessel at the water surface. If a leak develops in such line, the secondary seal cannot be provided. If it has been provided, it is only maintained as a result of continued application of hydraulic pressure thereto. If a leak then develops, the secondary seal becomes ineffective. While the secondary seal is effective, there is no way of ascertaining that the primary seal develops a leak, except through the purposeful introduction of fluid under pressure into the region between the primary and secondary seals. However, there is no automatic indication at the drilling vessel that a leak has developed, since the secondary seal would result in the retention of the pressure within the tubular connector.

By virtue of the present invention, the primary and secondary seals are effected automatically as a result of bringing the coupling members into final coupled relation with respect to each other. Any fluid that might tend to be trapped between the region between the primary and secondary seals may be released. In addition, the space between the primary and secondary seals can be continuously or intermittently monitored, as desired, so as to provide an instantaneous indication on the drilling vessel that a leak has developed. Moreover, the region between the primary and secondary seals can be pressure tested at any time to be assured that the primary and secondary seals do not leak. The completion of the primary and secondary seals at the same time insures that both seals will engage clean surfaces, the secondary seal being made effective at the same time as the primary seal, preventing a leak past the primary seal from occurring and remaining undetected for an extended period before the secondary seal is actuated, as in U.S. Pat. No. 3,333,870, thereby avoiding extensive damage to the primary seal before a secondary seal is actuated.

This invention possesses many other advantages and has other purposes which may be made more clearly apparent from a consideration of a form embodying the invention. This form is shown and described in the present specification and in the drawings accompanying and constituting a part thereof. It will now be described in detail, for the purpose of illustrating the general principles of the invention; but it is to be understood that such detailed description is not to be taken in a limiting sense.

Referring to the drawings:

FIG. 1 is a diagrammatic view of an underwater well bore in conjunction with a floating vessel and a marine riser conductor and associated equipment extending between the well bore and the vessel;

FIG. 2 is a quarter longitudinal section, on an enlarged scale, of the lower portion of the apparatus illustrated in FIG. 1;

Figure 3:
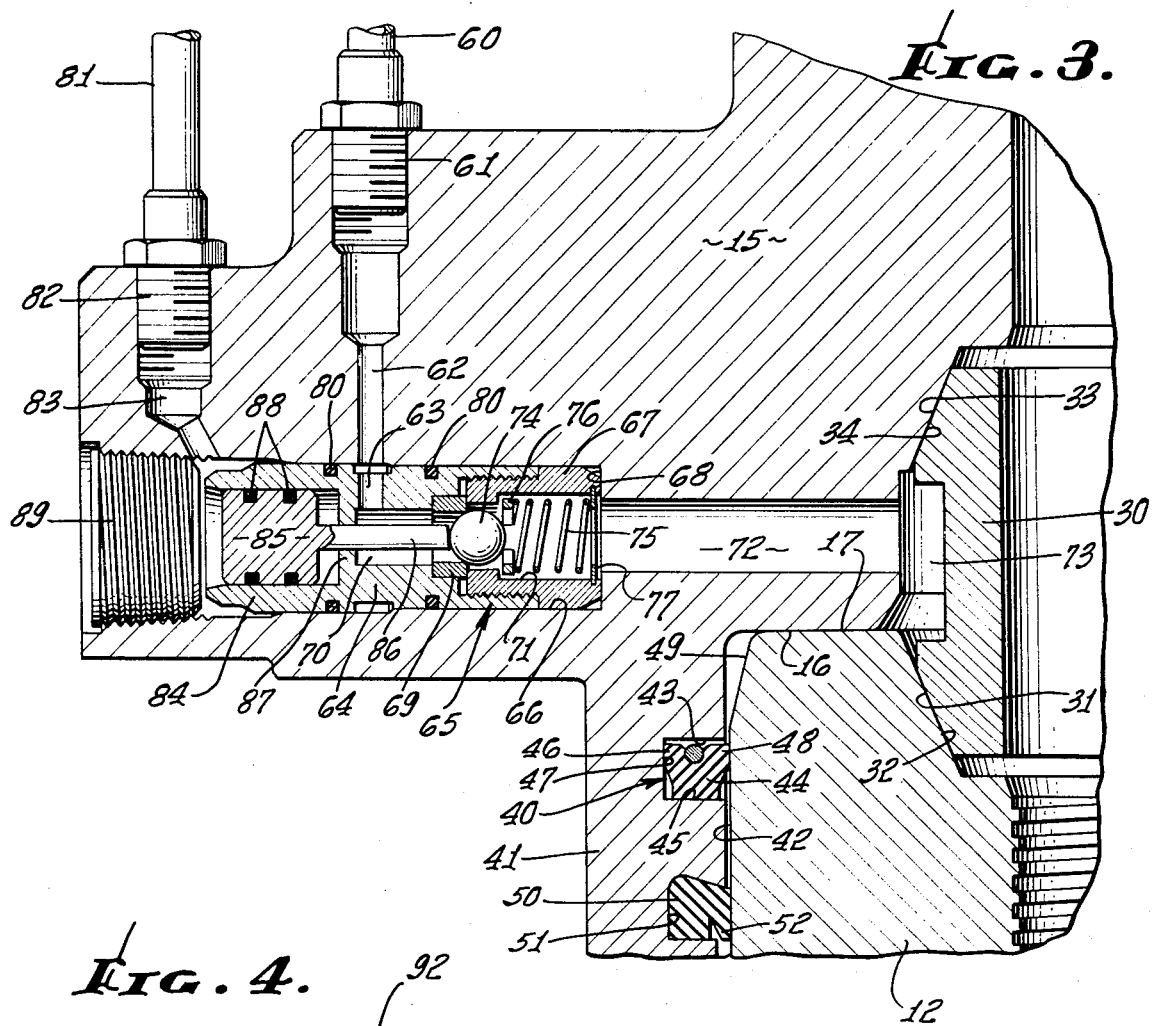
FIG. 3 is a further enlarged fragmentary section of the primary and secondary seal portions of the connector apparatus illustrated in the upper portion of FIG. 2.

As illustrated in FIG. 1, a subaqueous well bore W is being drilled downwardly from a mudline or ocean floor M underlying a drilling vessel V having a suitable drilling rig P thereon. A guide structure A is disposed at the mudline, with the usual guide lines B extending upwardly to the drilling vessel. Disposed and supported within the guide structure are a plurality of concentric casing strings C extending downwardly into the well bore, the casing strings being supported from suitable hangers D, E. F that may rest one upon the other, all in a known manner. As disclosed, an intermediate hanger E has a wellhead housing 10 extending upwardly therefrom and may have a wear bushing or seat protector 11 therewithin. The upper end portion 12 of such housing forms a part of a connector 13 secured to a blowout preventer stack H, which is, in turn, secured to a marine riser R extending upwardly through the water to the drilling vessel V.

The present invention is described specifically with respect to the connector 13 that effects a connection between the blowout preventer stack H and the wellhead housing 10, as a result of lowering the blowout preventer stack and marine riser from the drilling vessel downwardly through the water and along the guide lines B and into a position to be coupled and sealed with respect to the wellhead housing 10.

As disclosed in FIG. 2, the connector includes an outer, upper body 15 adapted to be telescoped downwardly over the upper portion 12 of the tubular housing 10 to an extent determined by the engagement of a downwardly facing shoulder 16 on the upper portion of the body with the upper end 17 of the housing. The housing has a plurality of peripheral, circumferential, external cam or tapered teeth 18 thereon adapted to be engaged by companion internal teeth 19 on a coupling ring or a plurality of dogs 20 mounted in the outer body, the ring or dogs having a downwardly and outwardly inclined tapered cam face 21 adapted to be engaged by a companion internally tapered face 22 on an actuator ring 23 pulled downwardly by a plurality of hydraulically actuated pistons 24 shiftable downwardly within the coupling body 15. When the dog or ring teeth 19 are forced inwardly against the external teeth 18 on the housing 10, they exert a downward axial movement on the main body 15 to pull it downwardly to its final position in which the shoulder 16 engages the upper end 17 of the tubular wellhead housing. Details of the construction and mode of operation of the coupling member per se form no part of the present invention and will be found in U.S. Pat. No. 3,321,217.

When the upper connector body 15 is shifted downwardly with respect to the wellhead housing 10, a metallic primary seal ring 30 is caused to effect a seal between the upper connector body 15 and the tubular housing 10. The primary seal ring has a lower, downwardly tapering external face 31 adapted to engage a companion internal sealing surface 32 in the upper portion 12 of the wellhead housing, and also an upper, upwardly tapering external face 33 adapted to engage a companion tapered internal seating surface 34 in the upper connector body 15. Thus, the bringing of the connector body downwardly into full coupling relation to the wellhead housing, under the inward camming action of the coupling ring or dogs 20 with respect to the external cam teeth 18 on the wellhead housing, will cause the seal ring faces 33, 31 and the upper and lower faces 34, 32 on the upper connector body and wellhead housing to be brought firmly into sealing engagement with each other. Such firm sealing relation will be achieved by the time the connector body shoulder 16 engages the upper end 17 of the wellhead housing.

While the connector body or tubular member 15 is being telescoped over the tubular wellhead housing 10, a secondary seal 40 is also provided between an inner cylindrical skirt portion 41 of the coupling body and an external cylindrical surface 42 on the wellhead housing above its circumferential cam teeth 18. Thus, a circumferential internal groove 43 is provided in the depending skirt portion 41 in which an elastomer secondary seal ring 44 is provided, bearing against the lower side 45 of the groove and having an outer, upwardly facing circumferential lip seal 46 sealingly engaging the base 47 of the groove and an inner, upwardly facing circumferential lip seal 48 which will move down along a tapered corner 49 at the upper end of the wellhead housing, and then slide sealingly along the cylindrical seal surface 42 on the periphery of the wellhead housing 10. An elastomer wiper ring 50 is provided in a companion internal groove 51 within the skirt portion 41 below the secondary seal ring 44, this wiper ring having an internal circumferential downwardly extending lip 52 which will move along the cylindrical surface 42 in advance of the secondary seal, to be assured that the cylindrical surface 42 is wiped clean of any foreign matter that may have adhered to it, and thereby offer assurance that the inner lip 48 of the secondary seal is making a full circumferential sealing engagement with the cylindrical surface 42. It is to be noted that any fluid pressure between the primary seal 30 and secondary seal 44 will act in a downward direction on the inner and outer lip seals 48, 46 and tend to urge them more firmly into sealing engagement with the cylindrical seal surface 42 and with the base 47 of the groove, thereby insuring against downward leakage past the secondary seal.

A hydraulic monitoring and testing line 60 is provided between the drilling vessel V and the connector body 15 to test the effectiveness of the primary and secondary seals 30, 44, to continuously or intermittently monitor the effectiveness of such seals (that is to say, whether or not leakage is present), and to permit the escape of any fluid that might be trapped between the primary and secondary seals as the connector body 15 is moved to its final coupled position with respect to the wellhead housing 10. The lower end of the monitoring line is connected through a suitable fitting 61 to a passage 62 in the connector body 15 that communicates with a lateral port 63 in an outer valve body section 64 of a valve body 65 mounted within a radial bore 66 extending inwardly from the periphery of the connector body, the outer valve body section being threadedly secured to an inner valve body section 67 engaging the base 68 of the bore, the inner and outer sections clamping a valve seat 69 therebetween. The port 63 communicates with a central passage 70 in the outer valve body section that opens into the valve seat 69, the inner valve body section 67 having a passage 71 therethrough communicating with a radial passage 72 opening into an internal region 73 in the connector body surrounding the primary seal ring 30. Fluid leakage along the periphery of the valve body 65 is prevented by seal rings 80 on the body 65 on opposite sides of the port 63 engaging the wall of the bore 66.

Mounted within the valve body 65 is a valve member 74, such as a ball, urged in a lateral outward direction into engagement with the valve seat 69 by a compression spring 75 bearing against a spring seat 76 engaging the ball, and also against a split retaining ring 77 suitably secured to the inner valve body section 67. The spring-pressed ball 74 and valve seat 69 constitute a check valve that automatically opens to permit fluid under pressure to pass from the monitoring line 60 through the passage 62 and into the body 65, disengaging the ball 74 from its seat 69 and flowing into the radial passage 72 and into the region 73 within the connector bore 70 of body and upper end 17 of the housing 10 surrounding the primary seal ring. This fluid under pressure also passes between the shoulder 16 and the end face 17 of the housing to the secondary seal 44.

The check valve 74 will automatically engage its seat 69 to prevent loss of pressure from the region 73 between the primary and secondary seals. However, the check valve 74 can be held from its seat selectively under the control of the operator on the frilling vessel. Thus, a valve operating line 81 extends from the drilling vessel V to a fitting 82 secured to the connector body 15 and communicating with a passage 83 opening into the bore 66 at the outer end of the valve body 65. This valve body has a cylinder portion 84 in which a piston 85 is shiftable, the piston having a suitable piston rod 86 secured thereto and slidable through an end wall 87 of the cylinder into the valve body passage 70 in a position to engage the valve ball 74. Suitable seal rings 88, such as O-rings, are mounted on the piston for slidable sealing against the wall of the cylinder. The outer portion of the bore 66 is closed by a plug 89 threaded into the connector body.

The application of pressure to the fluid in the valve operating line 81 will cause such pressure to act on the piston 85, shifting it toward the ball 74 and removing the ball from its seat 69, thereby providing open communication between the radial passage 72 and the monitoring line 60. The relieving of the fluid pressure in the valve operating line 81 will permit the helical compression spring 75 to reengage the ball 74 with its seat 69, thereby closing the radial passage 72.

Figure 4:
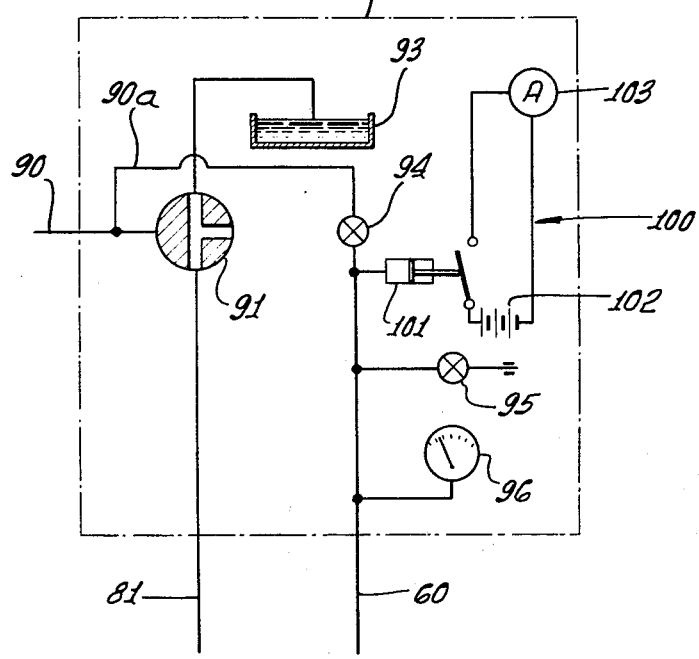
FIG. 4 is a diagrammatic view of the control and monitoring system used in determining the effectiveness of the primary and secondary seals illustrated in FIGS. 2 and 3.

As shown diagrammatically in FIG. 4, fluid from a suitable source (not shown) on the drilling vessel can pass into a fluid line 90 running to a three-way valve 91 mounted on a control panel 92 on the drilling vessel. This three-way valve, when moved to one position, such as to a position rotated 90 degrees in a clockwise direction from that illustrated in FIG. 4, will place the hydraulic line 90 in communication with the valve operating line 81, so that pressure is imposed on the piston 85 to shift it radially inwardly and disengage the check valve ball 74 from its seat 69 and retain it in the disengaged position. The location of the three-way valve in the position illustrated in FIG. 4 will bleed the valve monitoring line 81 to a suitable reservoir 93, thereby rendering the piston 85 ineffective and allowing the spring 75 to reengage the ball 74 with its companion valve seat 69.

Pressure from the source can also pass through the hydraulic line 90, 90a and through a suitable manually operated valve 94 into the monitoring line 60, for the purpose of applying pressure to the region 73 in the connector body 15 between the primary and secondary seals 30, 44 for the purpose of testing them for leakage. Fluid can be permitted to escape from such region by closing the inlet valve 94 and by opening a bleeder valve 95 connected to the monitoring line 60 to allow fluid to escape therefrom. The inlet valve 94 may be placed in the closed position and the test valve 95 opened during the telescopic movement of the connector body 15 over the valve housing 10 to permit any fluid to escape from the region 73 between the primary and secondary seals, pressure having been applied through the valve operating line 81 to the piston 85 to hold the valve ball 74 from its seat 69. The pressure in the monitoring line 60 can always be observed on a suitable pressure gauge 96 connected thereto.

The monitoring line 60 may be retained in communication with the radial passage 72 through the continued application of fluid pressure through the valve operating line 81 on the piston 85 to hold the ball valve member 74 from engaging its seat 69. Thus, with the inlet and bleeder valves 94, 95 closed and with the check valve held in its open position, the pressure in the region 73 between the primary and secondary seals can be observed on the gauge 96. If the primary seal 30 is leaking, the pressure will build up in the radial passage 72 and be transmitted through the fluid in the monitoring line 60 to the pressure gauge 96. The secondary seal ring 44 would be automatically placed into firmer sealing engagement with its companion seal surfaces 42, 47 by such build-up in pressure, so that the observance of an increase in pressure on the pressure gauge would inform the operator that the primary seal ring is leaking or has developed a leak.

To be assured as to which of the seal rings is leaking, the operator can, as has been done before, run a test tool on a running string through the marine riser R, closing the blowout preventer stack H around the running string and testing the primary seal 30. If a successful test is obtained, then it is the secondary seal 44 which has failed, and not the primary seal. However, the failure of the secondary seal 44 is very unlikely to occur since, once it is tested through the application of pressure through the monitoring line 60, it will remain in its static, sealed condition.

With the monitoring line 60 in communication with the region 73 between the primary and secondary seals, an alarm, signal or sensing device 100 may be provided to advise the operator immediately of the occurrence of a leak. With the ball valve 74 held from its seat 69 by the application of pressure to the piston 85, if pressure builds up in the fluid in the monitoring line, such pressure will close a pressure responsive switch 101, completing a circuit running from a suitable source of electric power 102 to an appropriate signal device 103, such as an alarm or light. When the alarm sounds or the light goes on, the operator is immediately advised of the existence of the build-up of pressure, and he can then proceed to take remedial action.

It is, accordingly, apparent that an apparatus has been provided for determining the sealing effectiveness of primary and secondary seals, the secondary seal being effective automatically and without requiring that it be subjected to an external power source, such as hydraulic pressure. The secondary seal is effective against a clean sealing surface. Any fluid that might tend to be trapped between the primary and secondary seals 30, 44 during the completion of the connection between the connector body 15 and housing 10 can be released through the monitoring line 60. Not only can the pressure in the region between the primary and secondary seals be increased to test the efficacy of such seals, but the same hydraulic line 60 can be used for continuously or intermittently determine whether a leak has developed in either or both of the seals. The operator will receive a warning that a leak has developed as soon as it occurs, as a result of a build-up in pressure in the monitoring line, and can take immediate remedial action to prevent damage to the equipment.

I claim:

1. In underwater connector apparatus: first and second tubular members having interconnecting fluid passages; means for coupling said members together; primary seal means engaging said members to prevent fluid flow from said passages to the exterior of said members; secondary seal means engaging said members between said primary seal means and the exterior of said members; said members defining a region between said primary and secondary seal means after said primary and secondary seal means both become sealingly effective; means communicating with said region for sensing fluid leakage through at least one of said seal means into said region, said sensing means including fluid passage means extending from said region through one of said members to the exterior thereof and then to the top of the water in which said members are disposed; valve means adjacent said region for preventing fluid flow from said region through said fluid passage means to the top of the water; and control means controlled from the top of the water for selectively opening and closing said valve means.

2. In apparatus as defined in claim 1; said sensing means further including means at the top of the water for indicating fluid pressure in said fluid passage means.

3. In apparatus as defined in claim 1; said sensing means further including means at the top of the water for indicating fluid pressure in said fluid passage means; and means for applying pressure to the fluid in said fluid passage means and region to test said primary and secondary seal means.

4. In apparatus as defined in claim 1; said valve means being a check valve closing to prevent fluid flow from said region through said passage means; said control means being engaged with said check valve to shift said check valve to open position.

5. In apparatus as defined in claim 1; said primary seal means and secondary seal means becoming sealingly effective as said members are being brought to final coupled relation to each other; said fluid passage means including a bleeder fluid passage from said region to the exterior of said members to prevent fluid from being trapped in said region as said members are being brought to final coupled relation; said valve means controlling fluid flow through said bleeder fluid passage.

6. In underwater connector apparatus: a first tubular member; a second tubular member adapted to be piloted over said first tubular member; means for coupling said members together; primary seal means engaging said members to prevent fluid flow from the interior of said tubular members to the exterior of said members; secondary seal means comprising a seal ring on one of said members slidably sealing against a cylindrical sealing surface on the other of said members as said second member is piloted relatively over said first member; said members defining a region between said primary seal means and seal ring after said primary seal means and seal ring become sealingly effective; means communicating with said region for sensing fluid leakage through at least one of said seal means into said region, said sensing means including fluid passage means extending from said region through one of said members to the exterior thereof and then to the top of the water in which said members are disposed; valve means adjacent said region for preventing fluid flow from said region through said passage means to the top of the water; and control means controlled from the top of the water for selectively opening and closing said valve means.

7. In apparatus as defined in claim 6; said sensing means further including means at the top of the water for indicating fluid pressure in said fluid passage means.

8. In apparatus as defined in claim 6; said sensing means further including means at the top of the water for indicating fluid pressure in said fluid passage means; and means for applying pressure to the fluid in said fluid passage means and region to test said primary and secondary seal means.

9. In apparatus as defined in claim 6; said control means comprising a cylinder, piston means in said cylinder operatively connected to said valve means; and a tubular line connected to said cylinder and extending to the top of the water for directing fluid under pressure into said cylinder to cause said piston to actuate said valve means.

10. In apparatus as defined in claim 6; said valve means being a check valve closing to prevent fluid flow from said region through said fluid passage means; said control means comprising a cylinder, piston means slidable in said cylinder and engageable with said check valve, and a fluid line connected to said cylinder and extending to the top of the water through which fluid under pressure can be conducted into said cylinder for operation upon said piston means to shift said check valve to open position.

* * * * *